June 30, 1970 G. E. BARKER 3,517,556

RESISTIVE-TYPE TEMPERATURE-TO-CURRENT TRANSDUCER

Filed May 2, 1967 2 Sheets-Sheet 1

INVENTOR
GEORGE E. BARKER
BY Harold A. Gatton
ATTORNEY

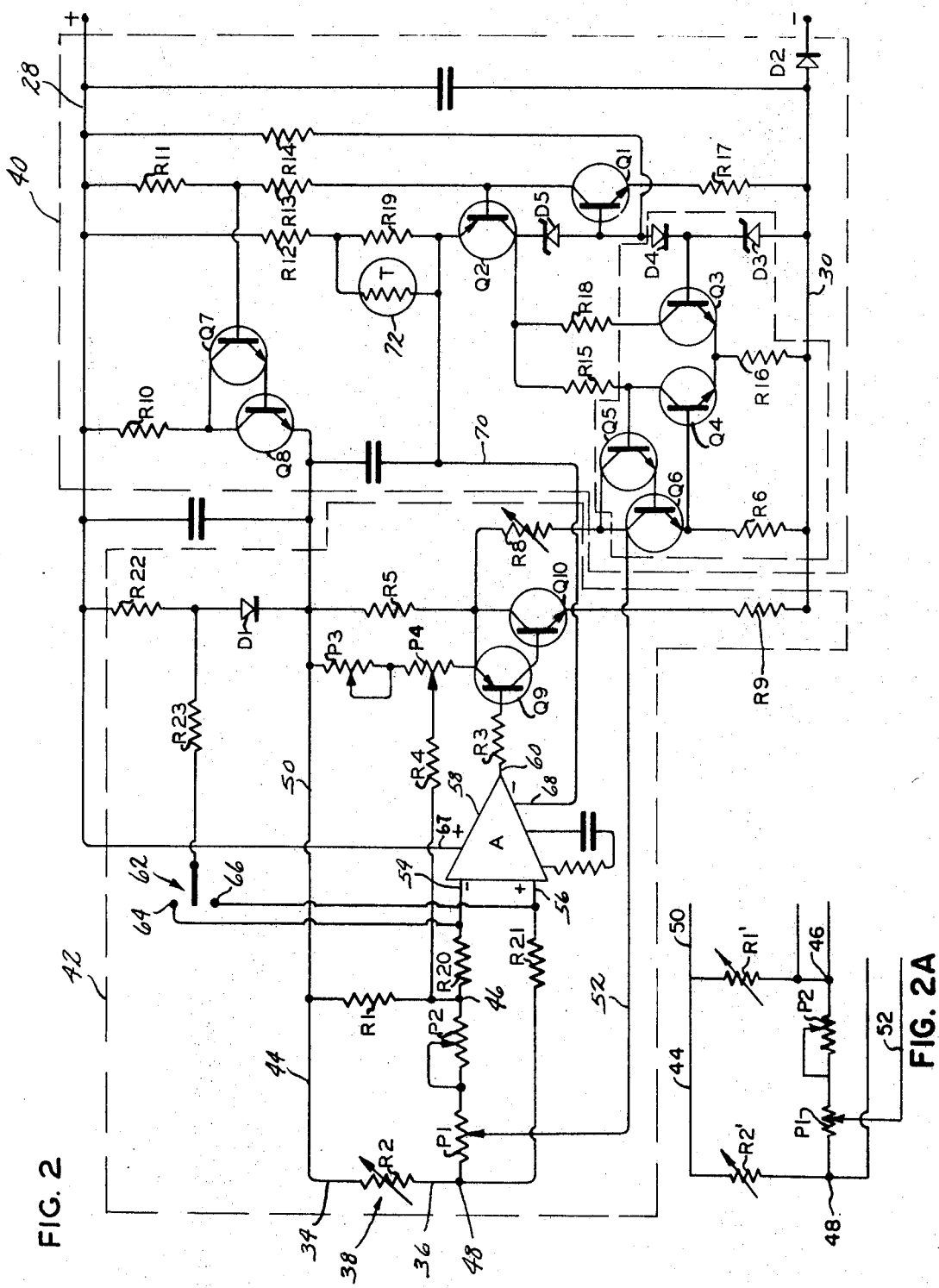

United States Patent Office 3,517,556
Patented June 30, 1970

3,517,556
RESISTIVE-TYPE TEMPERATURE-TO-CURRENT TRANSDUCER
George E. Barker, St. Louis, Mo., assignor to Monsanto Company, St. Louis, Mo., a corporation of Delaware
Filed May 2, 1967, Ser. No. 635,612
Int. Cl. G01k 7/20
U.S. Cl. 73—362                                  13 Claims

ABSTRACT OF THE DISCLOSURE

A temperature-to-current transducer adapted for field installation in an industrial plant, or the like, which requires only two leads for both information communication and power distribution between the control room and the field locations. The transducer includes a resistive bridge circuit having a bulb which senses temperature variations by resistance changes and delivers a corresponding voltage signal to a solid-state amplifier. The output of the amplifier drives a power transistor stage which in turn regulates the current level in the leads connecting the transducer to the control room. A constant-current power supply and feed-back circuits are provided to control the bridge circuit current in accordance with the measuring circuit output, thereby to enhance the accuracy and stability of the resulting temperature indication.

INTRODUCTION

The present invention relates generally to transducer systems for use in industrial process control applications, and more particularly to solid-state electronic temperature-to-current transducer circuitry, especially adapted for installation at a remote location and requiring only two leads to connect the transducer circuitry to a control room.

In the field dealing with electronic control systems for chemical, petroleum and like process applications, where remote sensing and control stations are linked to a central control room, it is highly desirable to employ a two-channel or two-wire communication link between the remote field location and the control room. Such two-wire systems require little, if any modification when used with existing, commercially-available equipment, such as recorders, controllers and the like. Furthermore, they tend to minimize installation and maintenance costs and procedures. In addition, as process control systems become more sophisticated and demand higher stabilities and accuracies, it is highly desirable to maintain the "two-lead concept" which found its inception in pneumatic control systems.

To achieve accurate temperature readings over long distances and yet maintain the two-lead concept presents several problems. For example, not only is it necessary that the information be conveyed over the leads linking the control room and field installation, but also the power required to energize the circuitry at the field installation must be supplied over the same leads. This imposes certain current limitations on the circuit designer and requires circuits which conserve electrical power. Heretofore these problems have not been overcome economically.

Most conventional field readings of temperature currently employ thermocouples whose extremely low-level voltage signals must be converted into current signals at the field installation by means of large, costly transducers, which require separate leads for their power supplies.

The general purpose of the present invention is to provide a temperature-to-current transducer circuit suitable for field installation which embraces the advantages of heretofore employed transducers, yet does not possess the aforedescribed disadvantages of size, cost and complexity.

To attain this, the field-mounted transducer of the present invention utilizes a resistive bridge circuit driven by a substantially constant-current power supply. Changes in the operation of the bridge circuit are sensed by a solid-state operational amplifier, which in turn is used to control the current level in the leads which deliver power from the control room to the field-mounted transducer. In this manner, an information signal is provided at the control room which is indicative of temperature variations sensed by the bridge circuit at the field location.

An object of the present invention is the provision of a novel temperature-to-current transducer system adapted for field installation and utilizing solid-state circuitry powered by the same leads used to convey temperature information to a control room.

Another object is to provide a temperature-to-current transducer having a high degree of accuracy, linearity, and stability over a wide range of temperatures.

A further object of the invention is the provision of a temperature-to-current transducer utilizing a bridge circuit including a platinum resistor and driven by a substantially constant current power supply, the power supply receiving electrical energy over the same leads which convey electrical signals indicative of temperature variations sensed by the bridge circuitry.

Yet another object of the invention is the provision of a unique, compact temperature-to-current transducer employing solid-state circuitry, and including circuits which compensate for the nonlinearity of the temperature-sensing elements and error signals resulting from ambient temperature changes of the solid-state circuit elements.

BRIEF SUMMARY OF THE INVENTION

In the present invention these purposes (as well as others apparent herein) are achieved generally by providing a central station having a two-terminal D.C. voltage supply source and a measuring device connected in series with the supply source to indicate the current flow therein. The central station is connected to a remote station by two interconnecting leads. At the remote station, solid-state circuitry is provided, including two parallel current paths which derive their current from the supply terminals to which the interconnecting leads are secured. One current path includes a temperature-sensing bridge circuit and a circuit for maintaining a substantially constant current therein. The other current path includes a power transistor which regulates the current in the interconnecting leads according to temperature variations sensed by the bridge circuit.

By means of this circuit arrangement, temperature variations are converted to a current signal which is transmitted back to the central station by the same leads which supply the power to the remote station.

BRIEF DESCRIPTION OF THE DRAWINGS

Utlization of the invention will become apparent to those skilled in the art from the disclosures made in the following detailed description of a preferred embodiment of the invention as illustrated in the accompanying drawings, in which:

FIG. 2 is a detailed schematic circuit diagram of the temperature-to-current transducer circuit of the present invention.

FIG. 2A is a schematic diagram of a bridge circuit containing two temperature sensitive resistors and which may be substituted for the bridge circuit shown in FIG. 2.

GENERAL TRANSDUCER SYSTEM DESCRIPTION

Figure 1:
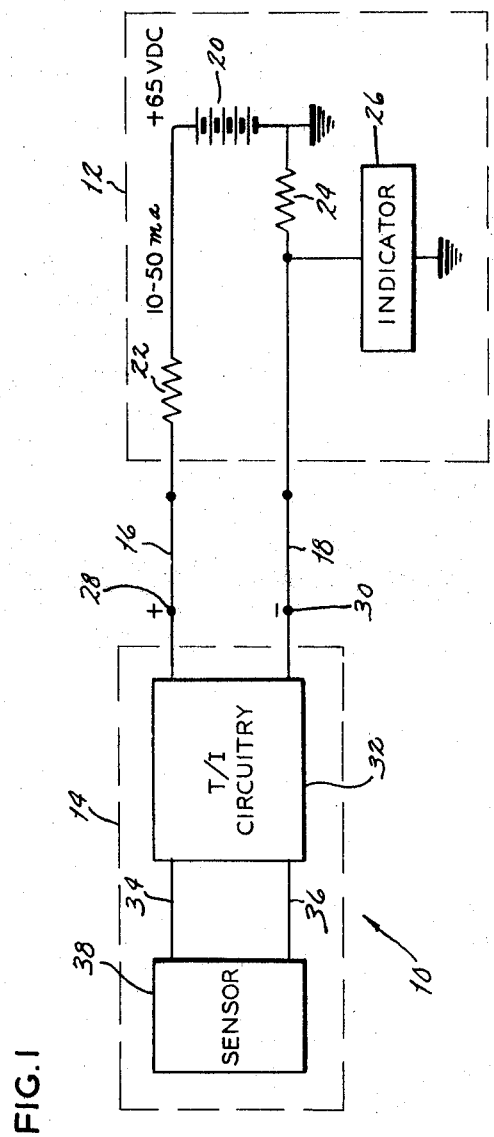
FIG. 1 is a block diagram representation of the temperature-to-current transducer system of the present invention.

Referring now to the drawings, wherein like reference characters designate like or corresponding parts throughout the several views, there is shown in FIG. 1 a temperature-to-current transducer system, generally designated 10, consisting of a central control room 12 linked to a field installation 14 by a pair of leads 16 and 18. At the central control room 12 there is provided a two-terminal D.C. voltage supply source, such as the battery 20 whose positive terminal is connected to the lead 16 by a current-limiting resistor 22. The negative terminal of the battery 20 is connected to a common reference potential; for example, ground potential, and electrically coupled to the lead 18 by a load resistor 24. An indicator 26 is shown connected between the load resistor 24 and ground potential for the purpose of indicating the magnitude of the current signal flowing through the load resistor 24.

At the field installation end of each interconnecting lead 16 and 18, there are provided field power supply terminals 28 and 30. The field power supply terminals 28 and 30 are connected to temperature-to-current transducer circuitry, ggenerally designated 32, which in turn is connected by means of leads 34 and 36 to a temperature-sensing element 38.

GENERAL TRANSDUCER SYSTEM OPERATION

In operation the temperature-sensing element 38 of the temperature-to-current transducer system 10 senses a temperature at the field installation 14, the circuitry 32 converts the sensed temperature into a corresponding current signal and the leads 16, 18 deliver the current signal to the central room 12, where it is recorded or displayed by the indicator 26. More specifically, the temperature-sensing element 38 converts the temperature variations at the field installation 14 into a voltage signal. The voltage signal is then converted to a current signal which is sent back to the control room over the leads 16 and 18.

It should be noted that these same leads 16, 18 are used to supply the power from the central control room battery 20 to the power supply terminals 28, 30 of the field installation 14.

In many applications of the temperature-to-current transducer system 10, the field installation 14 may be located more than a thousand feet from the central control room 12. In order to supply the energizing power from the central control room over such distances and send back a current signal of sufficient magnitude to be accurately measured (without employing auxiliary power supplies and the like) it is necessary to utilize electronic circuitry at the field installation which consumes a minimum amount of current. The circuitry now to be described accomplishes this end, and further provides a highly-accurate, temperature-indicating current signal.

DETAILED TRANSDUCER CIRCUIT DESCRIPTION

Referring now to FIG. 2, there is shown in schematic detail the temperature-to-current transducer circuitry 32, including the temperature sensing element 38. The temperature-to-current transducer circuit 32 consists essentially of two portions; the portion included within the dashed line 40 being the power supply portion and that included in the dashed line 42 being the temperature-measuring and conversion portion.

MEASURING AND CONVERSION CIRCUIT

The measuring and conversion circuit 42 of the temperature-to-current circuit 32 consists essentially of two current paths which derive their current solely from the field installation power supply terminals 28 and 30. The power supply terminal 28 is coupled to a positive-potential reference terminal 50 by power supply circuitry, to be described hereinafter. One current path between reference terminal 50 and the power supply terminal 30 includes two legs of a Wheatstone bridge circuit (formed by the series, resistor-potentiometer combination of resistor R2-potentiometer P1 and resistor R1-potentiometer P2), a lead 52, the collector-emitter path of a constant-current power supply transistor Q6, and a precision resistor R6. The other current path between the positive potential reference terminal 50 and the power supply terminal 30 includes a resistor R5, the collector-emitter path of a power-stage transistor Q10, and resistor R9.

The bridge circuit is a resistive-type bridge consisting of two parallel resistance legs, each of which branches from the reference terminal 50 and converges at a movable slider terminal of the potentiometer P1. That is, one leg includes the standard resistor R1, a fine zero-adjustment potentiometer P2, and a portion of the coarse zero-adjustment potentiometer P1. The other leg of the bridge circuit includes the resistive sensing element 38, preferably a platinum bulb-type sensor, and a portion of the coarse, zero-adjustment potentiometer P2.

It may be seen that in essence the bridge circuit compares the potential drop across the sensing element 38 to that across the standard resistor R1. In its balanced condition the bridge will provide no voltage difference at the output terminals 46 and 48. However, upon the occurrence of temperature variations, the potential drop across sensing element 38 will tend to change accordingly. However, by means of an operational amplifier 58, to be described, a feedback current is supplied to the leg of the bridge circuit including the standard resistor R1. In this manner, the bridge is maintained in its balanced condition, and the amplifier output signal from which the feedback is derived takes on a new value which corresponds to the temperature change. It will be apparent that instead of using a standard resistance R1 in the bridge circuit a temperature sensitive resistor, R1', as shown in FIG. 2A, could be used. In the latter case, the difference in the potential drops across temperature sensitive resistors R1' and R2, which would be placed in different temperature environments, represents the temperature differential between the two temperature environments.

The output terminals 46 and 48 of the Wheatstone bridge circuit are connected by input matching resistors R20 and R21 to the negative (inverting) and positive (noninverting) input terminals 54 and 56 of a solid-state operational amplifier 58. The operational amplifier 58 is provide with an output terminal 60 which is coupled to the base electrode of a PNP transistor Q9 by a current-limiting resistor R3.

The emitter electrode of the PNP transistor Q9 is coupled to the reference terminal 50 by a series resistance combination including coarse and fine, span-adjustment potentiometers P4 and P3, respectively. The movable slider terminal of the coarse span-adjustment potentiometer P4 is coupled to the negative input terminal 54 of the operational amplifier 58 by a feedback resistor R4 connected to the input matching resistor R20. The collector electrode of the PNP transistor Q9 is directly connected to the base electrode of an NPN transistor Q10.

The collector electrode of the NPN transistor Q10 is directly connected to the emitter electrode of the PNP transistor Q9 and further coupled to the reference terminal 50 by resistor R5. The emitter electrode of the PNP transistor Q10 is coupled to the supply terminal 30 of the temperature-to-current transducer circuitry 32 by resistor R9. Thus, it may be seen that the transistor pair Q9, Q10 together serve as an output current amplification stage for the measuring circuit 42.

A diode D1 is provided with its cathode electrode connected to the reference terminal 50. Its anode electrode is coupled to the positive power supply terminal 28 of the temperature-to-current transducer circuitry 32 by a current-limiting resistor R22. The cathode electrode is also connected to a resistor R23, which in turn is connected to a movable arm of a single-throw, double-pole switch 62. One contact terminal 64 of the switch 62 is connected to the input matching resistor R20 of the operational amplifier 58, and the other contact terminal 66 is connected to the input matching resistor R21 thereof. As will be more fully described hereinafter, the diode D1 is chosen to provide a known temperature coefficient and a corresponding feedforward voltage signal to either the inverting or noninverting input of the operational amplifier 58 to compensate voltage offsets or temperature drifts of the amplifier.

DETAILED DESCRIPTION OF THE TRANSDUCER POWER SUPPLY

The power supply circuit 40 of the temperature-to-current transducer 32 includes four separate reference potential supplies, three of which rely upon a reliable potential derived from a precision Zener diode D3. The four supplies required are a positive reference potential, for application to the bridge circuit and amplifier stage Q9 and Q12, positive and negative potential supplies for the solid-state operational amplifier 58, and a precision constant current supply for the bridge current.

The positive supply for the operational amplifier is provided by directly connecting the positive power supply terminal 67 of the operation amplifier 58 to the positive field supply terminal 28.

The negative reference potential for the operational amplifier is obtained as follows: The precision Zener diode D3 of the power supply circuit 40 has its anode electrode connected to the negative power supply terminal 30, and its cathode electrode is connected to the cathode of a conventional diode D4. The anode of the diode D4 is connected to the positive supply terminal 28 by a current-limiting resistor R14, and is further connected to the base electrode of an NPN voltage-inverting transistor Q1. The emitter electrode of the voltage-inverting transistor Q1 is connected to the negative power supply terminal 30 through a resistor R17, and its collector electrode is coupled to the positive power supply terminal 28 through a voltage divider consisting of the series connection of two resistors R11 and R13. In addition, the collector electrode of the voltage-inverting transistor Q1 is directly connected to the base electrode of a PNP constant-current transistor Q2. The collector electrode of the constant current transistor Q2 is coupled to the base electrode of the voltage-inverting transistor Q1 by a Zener diode D5. The Zener diode D5 is poled with its anode connected to the base electrode of the voltage inverting transistor Q1 and its cathode connected to the collector electrode of the constant current transistor Q2.

The emitter electrode of the constant current transistor Q2 is coupled to the power supply terminal 28 by a voltage divider consisting of the series connection of two resistors R12 and R19. The emitter electrode of the constant current transistor Q2 is also connected to the negative power supply terminal 68 of the operational amplifier 58 by a lead 70.

A thermistor 72 is connected in parallel with the resistor R19 for purposes to be described hereinafter.

The positive reference potential for terminal 50 is provided as follows: Two NPN transistors Q7 and Q8 are provided to form a conventional Darlington transistor pair for coupling the junction of resistors R11 and R13 to the reference terminal 50. The base electrode of transistor Q7 is connected to the junction of the voltage divider resistors R11 and R13, and its emitter electrode is directly connected to the base electrode of the transistor Q8. The collector electrodes of both transistors Q7 and Q8 are coupled to the positive power supply terminal 28 through resistor R10. The emitter electrode of transistor Q8 is directly connected to the reference terminal 50.

The constant current supply includes a pair of NPN transistors Q3 and Q4 connected in the common differential amplifier fashion. That is, the emitter electrodes of transistors Q3 and Q4 are connected to the negative power supply terminal 30 through resistor R16 and their collector electrodes are connected to the cathode of Zener diode D5 through separate collector resistors R18 and R15. The base electrode of transistor Q3 is directly connected to the cathode electrode of the precision Zener diode D3, while the base electrode of transistor Q4 is directly connected to the emitter electrode of transistor Q6.

A second pair of NPN transistors Q5 and Q6 is provided, with the base electrode of transistor Q5 connected to the collector electrode of transistor Q4 and its emitter electrode connected to the base electrode of the transistor Q6. The collector electrodes of both transistors Q5 and Q6 are coupled to the collector electrode of the transistor Q10 by a linearity-determining resistor R8. In addition these collector electrodes are connected by lead 52 to the movable slider of the coarse zero-adjustment potentiometer P1. The emitter electrode of the transistor Q6 is coupled to the negative power supply 30 through the precision resistor R6.

OPERATION OF POWER SUPPLY CIRCUITRY

When the interconnecting leads 16 and 18 are connected to the power supply terminals 28 and 30 of the field installation 14, power is delivered from the central station battery 20 to the power supply circuitry 40 at the field installation 14. As power is supplied to the terminals 28 and 30, starting current is supplied to the precision Zener diode D3 by means of a bleed current of approximately 10 microamperes flowing through resistor R14 and conventional diode D4.

Upon the application of the starting current to precision diode D3, it is energized and provides a substantially constant potential of about 6.2 volts at the base electrode of the inverting transistor Q1. The potential at the base electrode produces a proportional current flow through the resistor R17, and further provides an inverted potential at the collector electrode. In this manner the voltage divider resistors R11 and R13 establish the desired reference potentials at the bases of transistors Q7 and Q2. The value of resistor R11 is chosen such that the potential at the base of the transistor Q7 is approximately 10.6 volts less than the positive potential applied to power supply terminal 28, and the value of resistor R13 is chosen such that the reference potential at the base of the transistor Q2 is approximately 12.6 volts less than the reference potential supplied to the base of the transistor Q7. The application of this reference potential to the base of transistor Q2 provides a resulting negative voltage at the emitter electrode for application to the negative power supply terminal of the operational amplifier 58.

Substantially all of the collector current from the constant current transistor Q2 is delivered to the series diode chain including Zener diode D5, conventional diode D4, and precision Zener diode D3 (very little of the collector current flowing through the collector resistors R15 and R18 of the transistors Q4 and Q3). It should be noted that the current supplied from the power supply terminal 28 to the positive power supply terminal of the operational amplifier 58, flows from the negative terminal 68 to the emitter electrode of constant current transistor Q2, and thence through emitter-collector path to the diode chain including the Zener diode D3. In this maner the current used to power the operational amplifier 58 in effect does double duty; that is, it flows through the diode chain to contribute to the necessary drive current for the precision Zener diode D3. The available current supplied to the field installation 14 from the central station 12 is thereby conserved, making more current available to power the bridge circuitry and output amplifier stage of the transducer circuitry 32.

The Darlington pair circuit provided by transistors Q7 and Q8 transfers the reference potential applied to the base electrode of Q7 to the positive reference supply terminal 50. In addition, this arrangement of transistors Q7 and Q8 presents a low impedance to the bridge circuitry, and thereby improves the performance of the measuring circuit 42.

The constant-current supply operates as follows: A positive voltage supply for the transistors Q3 and Q4 circuit is provided by the Zener diode D5. This Zener diode D5 produces a regulated voltage supply to the collector resistors R15 and R18 of the differential amplifier of transistor pair Q3 and Q4. The transistor pair Q3 and Q4 form a differential amplifier with the base electrode of the transistor Q3 connected to the constant potential provided by the Zener diode D3. This voltage is applied by the transistor Q3 to the emitter of the transistor Q4 where it serves as a reference potential for the potential applied to the base of the transistor Q4. The output of the differential amplifier pair Q3, Q4 is a voltage signal taken from the collector electrode of transistor Q4. It will increase or decrease depending upon voltage changes which tend to occur across the precision resistor R6. This output is used to drive the Darlington pair consisting of transistors Q5 and Q6 so that the current from the emitter electrode of the transistor Q6 is delivered to counteract any voltage change which tends to occur across the precision resistor R6. Consequently, a constant current is maintained in resistor R6. The net result of this feedback loop, including the transistor Q4 and the transistors Q5 and Q6, is that the collector electrode of the transistor Q6 provides to the bridge circuit a substantially constant current which is completely independent of both voltage and resistance variations.

OPERATION OF THE MEASURING CIRCUIT

The constant-current power supply, just described, delivers substantially constant current to the movable slider of the coarse zero-adjustment potentiometed P1 of the bridge circuitry by means of the lead 52. The constant-current insures that temperature variations effecting the resistance values of the zero-adjustment potentiometers P1 and P2 will not unbalance the bridge and produce an incorrect measurement, as might be the case where a voltage supply is used to power the bridge circuitry.

Initially the transducer circuitry is calibrated by subjecting the sensing element 38 to the minimum temperature to be measured (or a known resistor corresponding to that temperature) and with the span adjustment potentiometers P3 and P4 set to provide minimum feedback, adjusting the zero-adjustment potentiometers until the current level in leads 16 and 18 is some desired minimum current above that required for supplying power to the circuitry 32. For example, if six milliamps are required for proper biasing, ten milliamps may be chosen for the desired current at the minimum temperature. Next, the sensing element is subjected to the maximum temperature to be measured and the span-adjustment potentiometers adjusted to provide a current level of five times the minimum current, or say 50 milliamps. This then establishes the standard 1-to-5 current range for industrial measurement equipment. The procedure just described should be repeated several times to provide a highly accurate span.

After calibration, any change in the temperature to be measured causes the resistance of the sensing element 38 to change. This tends to unbalance the bridge and apply a differential input signal to the inputs 54 and 56 of the solid-state operational amplifier. However, as is well known, the operational amplifier will counteract this tenddency by means of the feedback from its output 60 to its input terminal 54. The change in the output signal from amplifier 58 to accomplish this rebalancing of the bridge circuit is coupled to the amplifier stage consisting of the transistors Q9 and Q10 by means of resistor R3. In this manner, the output voltage of the operational amplifier 58 is applied across the emitter resistor R5 of the transistor Q9, producing a corresponding current flow in the collector-emitter path of the transistor Q10 and the resistor R9. The current through resistor R9 is applied to the power supply terminal 30, thereby changing the D.C. current level in the interconnecting leads 16, 18. For example, if the temperature range calibrated for initially was from 100° C. to 500° C. and the temperature changed from an initial temperature of from 200° C. to 300° C., the current level will change from 20 milliamps to 30 milliamps. This change in the D.C. current level is independent of the voltage applied at leads 16 and 18 and is detected by the indicator 26 at the central station.

It has been found that all platinum bulb-type thermometers when used as the sensing element 38 exhibit a nonlinear resistance-temperature characteristic. Therefore, it is desirable to compensate for this nonlinearity in order to achieve highly accurate temperature measurements.

The temperature-to-current transducer circuitry 32 of my invention compensates the nonlinear characteristic of the platinum thermometer sensing element 38 by means of a current feedback loop including the linearity-determining resistor R8. The resistor R8 feeds back a current signal to the collector electrode of the transistor Q6 of the constant current supply circuitry. Since the current flow in resistor R6 of the constant-current supply circuitry is maintained at a constant level as described hereinabove, the current flow in lead 52, and therefore the bridge circuitry is modified accordingly.

For example, starting with the proposition that the platinum thermometer sensing element 38 has a nonlinear resistance-temperature characteristic such that the actual resistance change at mid-span is more than that obtained from a perfecly linear resistance thermometer sensing element, then the output voltage from the bridge terminals 46, 48 will be increased proportionately. The action of the operational amplifier 58 to maintain the balance of the bridge circuit will then produce an output signal, which regulates the amplifier stage in such a fashion as to result in an abnormally large current flow at the collector electrode of the transistor Q10. The linearity-determining resistor R8 feeds back a selected portion of this current to the collector electrode of the transistor Q6, thereby increasing the current flow in lead 52 and consequently the current flow through the bridge circuitry. This increase of the current flow produces a compensating nonlinearity in the output voltage at terminals 46 and 48, which nonlinearity is in opposition to that inherent in the platinum thermometer 38. It has been found that by proper selection or adjustment of the linearity-determining resistor R8, the linearity error of the platinum thermometer 38 can be reduced to as low as 0.03% for a 350° C. temperature span.

Another source of potential error is the offset voltage drift of the specific solid state operational amplifier 58 chosen for the transducer circuitry 32. Such offset voltage drift is inherent in most commercially available operational amplifiers of the integrated circuit design. In the present invention the offset voltage drift of the operational amplifier 58 is compensated by a circuit including the diode D1.

The diode D1 has an inherent temperature coefficient; for example, a −2.2 millivolt per degree centigrade coefficient has been found to provide satisfactory performance. The diode is subjected to the same ambient temperature of the operational amplifier 58. In this manner it serves as a voltage source to generate a current corresponding to its temperature coefficient and suitable for compensating the offset voltage drift of the amplifier. In the circuitry of FIG. 2, the voltage so generated across the diode D1 is converted to a current signal by resistor R23 and applied to either the inverting or noninverting input 54 or 56 of the operational amplifier 58 by the switch 62.

For example, where the operational amplifier has a positive temperature coefficient of offset temperature drift, the current signal is applied to the inverting input terminal 54. On the other hand if the operational amplifier has a negative temperature coefficient of offset temperature drift, this signal is applied to the noninverting input terminal 56.

It has been found that the thermistor 72 will advantageously compensate for current variations in lead 70 due to the positive temperature characteristics of resistances of the operational amplifier 58. That is, the thermistor 72, having a negative temperature characteristic, will offset any changes in current in lead 70 due to temperature changes of the operational amplifier 58. In this manner, the current from the operational amplifier terminal 58 used to help drive the precision Zener diode D3 is maintained substantially constant and does not adversely affect the basic reference potential supplied thereby.

In summary, there has been described a novel solid-state electronic temperature-to-current transducer system utilizing resistive type sensing elements, voltage-to-current conversion circuitry, and signal transmitting circuitry which are compact and can be readily field mounted or installed and powered from a central control station. Only two leads are required to deliver power to the field circuitry and return highly accurate, temperature-indicative signals back to the central control station.

Many modifications and variations of the present invention are possible in light of the above teachings. For example, various types of resistive sensing elements other than a platinum bulb may be employed as the temperature sensing element, and various unipolar or other equivalent devices, such as MOS field effect transistors, may be substituted for the transistors described without departing from the spirit of the invention. Therefore, the invention may be practiced otherwise than as specifically described.

I claim:
1. A temperature-to-current transducer system, comprising
 a central station including
  a two-terminal DC voltage supply source, and
  means connected in series circuit with said supply source for providing an indication corresponding to the magnitude of current flow between said two terminals of said supply source, and
 a remote station including
  first and second supply voltage terminals,
  first and second parallel current paths coupled between said first and second supply voltage terminals,
  said first parallel current path including a bridge circuit comprising first and second input terminals and first and second resistance paths connected between said first and second input terminals, said first path including a first temperature-responsive element and a first bridge output terminal, and said second path including a second temperature-responsive element and a second bridge output terminal, whereby the temperature differential between the environments in which the respective temperature-responsive elements are placed is provided by the difference of potentials between said output terminals,
  said second parallel current path having means coupled to said output terminals of said bridge circuit and responsive to the difference of potentials between said output terminals to control the current therethrough,
  together with means electrically connecting said first and second supply voltage terminals of said remote station with said two terminals of said supply source of said central station,
  whereby, upon temperature variations at said remote station, said potential difference between said bridge output terminals causes a corresponding current signal to flow in said second parallel current path, said current being supplied to and displayed by said central station indicating means.

2. A temperature-to-current transducer system, comprising
 a central station including
  a two-terminal D.C. voltage supply source, and
  means connected in series circuit with said supply source for providing an indication corresponding to the magnitude of current flow between said two terminals of said supply source, and
 a remote station including
  first and second supply voltage terminals,
  first and second parallel current paths coupled between said first and second supply voltage terminals,
  said first parallel current path including a bridge circuit comprising first and second input terminals and first and second resistance paths connected between said first and second input terminals, said first path including a standard resistance and a first bridge output terminal, and said second path including a temperature-responsive element and a second bridge output terminal, and
  an operational amplifier including input terminals connected to said bridge output terminals, thereby to receive a voltage signal corresponding to the potential difference between the voltage drop across said standard resistance and that across said temperature-responsive element,
  together with constant current circuit means for maintaining a substantially constant current supply to said bridge circuit,
  said second parallel current path having current controlling means coupled to the output circuit of said operational amplifier and responsive thereto to control the current through said second parallel current path,
  together with,
  means electrically connecting said first and second supply voltage terminals of said remote station with said two terminals of said supply source of said central station,
  whereby, upon temperature variations at said remote station, said bridge circuit and said operational amplifier cause a corresponding current signal to flow in said second parallel current path, said current being supplied to and displayed by said central station indicating means.

3. The temperature-to-current transducer system as defined in claim 2, wherein
 said temperature-sensitive element is a platinum resistor.

4. The temperature-to-current transducer system as defined in claim 2, wherein said constant current circuit means, comprises
 a three-terminal device including a first terminal connected to said second input terminal of said bridge circuit, a second terminal electrically coupled to said second supply terminal of said remote station, and
 circuit means electrically coupled to the third terminal of said three-terminal device for maintaining the current flow through said first and second terminals substantially constant.

5. The temperature-to-current transducer system as defined in claim 4, wherein said circuit means connected to said third terminal of said three-terminal device, comprises
 a source of biasing potential
 a source of substantially constant potential,
 first and second transistors having their emitter electrodes coupled to said second supply terminal of said remote station by means of a common emitter resistor, the base electrode of said first transistor being connected to said second terminal of said three-terminal device and the base electrode of said second transistor being connected to said source of constant potential, the collector electrodes of said transistors being connected to said source of biasing potential by respective collector resistors, and the collector of said first transistor further being electrically coupled to said third terminal of said three-terminal device.

6. A temperature-to-current transducer circuit especially adapted for field installation and of the type requiring but two leads for connection to a control room, comprising first and second supply voltage terminals, first and second parallel current paths coupled between said first and second supply voltage terminals, said first parallel current path having in series circuit a current-driven bridge circuit including a temperature-sensing element and circuit means for maintaining a substantially constant current in said first parallel current path, said bridge circuit having output terminals providing an electrical signal corresponding to temperature variations sensed by said temperature-sensing element, said temperature-sensing element having a non-linear temperature coefficient of a known characteristic, said second parallel current path including means coupled to said output terminals of said bridge circuit and responsive to said electrical signal to control the current through said second parallel current path, and means for compensating for the non-linear temperature coefficient of said temperature-sensing element, comprising feed-back means electrically connected to said second current path for feeding back to said bridge circuit a signal proportional to the current flow through said second current path.

7. The temperature-to-current transducer circuit as defined in claim 6, wherein said feedback means is a resistor connected between said second parallel current path and said constant current circuit means, said resistor having a predetermined resistance to change the current delivered to said bridge circuit by an amount sufficient to compensate the non-linear temperature characteristic of said temperature-sensing element.

8. A temperature-to-current transducer circuit especially adapted for field installation and of the type requiring but two leads for connection to a control room, comprising first and second supply voltage terminals, first and second parallel current paths coupled between said first and second supply voltage terminals, said first parallel current path having a current-driven, bridge circuit, including a standard resistance in one leg thereof and a temperature-sensing resistance in the opposite leg thereof, said bridge circuit having output terminals providing a voltage signal corresponding to temperature variations sensed by said temperature-sensing resistance, an operational amplifier having input terminals connected to the output terminals of said bridge circuit and an output terminal for providing an output signal corresponding to said temperature variations, said second parallel current path having means coupled to said output terminal of said operational amplifier and responsive to said amplified signal therefrom to control the current through said second parallel current path, said second parallel current path further including output means for providing a voltage signal corresponding to the current flow in said second current path, negative feedback circuit means connecting said output means and said bridge circuit, thereby to provide a feedback signal to maintain said bridge circuit in its balanced condition.

9. The temperature-to-current transducer circuit as defined in claim 8, further comprising an offset voltage compensation circuit connected between said output means for said input terminals of said operational amplifier, thereby to compensate drift voltage errors due to environmental temperature changes.

10. The temperature-to-current transducer as defined in claim 9, wherein said second circuit, comprises a forward-biased diode having a predetermined voltage-temperature characteristic to compensate the voltage-temperature characteristic of the operational amplifier.

11. A temperature-to-current transducer circuit especially adapted for field installation and of the type requiring but two leads for connection to a control room, comprising first and second supply voltage terminals, a power supply circuit coupled between said first and second supply voltage terminals, said power supply circuit including a means for establishing a fixed reference potential, first and second parallel current paths coupled between said first and second supply voltage terminals, said first parallel current path including in series circuit a current-driven, temperature-sensing circuit and circuit means for maintaining a substantially constant current in said first parallel current path, said temperature-sensing circuit having output terminals for providing an electrical signal corresponding to temperature variations sensed by said temperature-sensing circuit, an amplifier having input terminals connected to the output terminals of said temperature-sensing circuit and an output terminal for providing an output signal corresponding to said temperature variations, said second parallel current path having means coupled to said output terminal of said amplifier and responsive to said output signal to control the current through said second parallel current path, said amplifier being connected to receive energizing current from said power supply circuit and further being connected to said fixed reference potential means of said power supply circuit to supply said energizing current thereto.

12. The temperature-to-current transducer circuit as defined in claim 11, further comprising a negative-temperature compensation circuit connected between said amplifier and said fixed reference potential means, said negative-temperature compensation circuit providing a temperature-responsive current to compensate current variations due to environmental temperature changes at said amplifier.

13. The temperature-to-current transducer circuit as defined in claim 12, wherein said negative temperature circuit means includes a thermistor, and said fixed reference potential means is a Zener diode.

References Cited

UNITED STATES PATENTS

| | | | |
|---|---|---|---|
| 2,752,473 | 6/1956 | Hage | 219—499 XR |
| 2,974,303 | 3/1961 | Dixon. | |
| 3,028,756 | 4/1962 | Takagishi. | |
| 3,263,092 | 7/1966 | Knauss | 307—318 XR |
| 3,316,765 | 5/1967 | Trolander et al. | |

LOUIS R. PRINCE, Primary Examiner

F. SHOON, Assistant Examiner

U.S. Cl. X.R.

323—75; 340—186